US011981606B2

(12) United States Patent
Bandiera et al.

(10) Patent No.: US 11,981,606 B2
(45) Date of Patent: *May 14, 2024

(54) CEMENT-REDUCED CONSTRUCTION COMPOSITION

(71) Applicant: Construction Research & Technology GmbH, Trostberg (DE)

(72) Inventors: Massimo Bandiera, Trostberg (DE); Peter Schwesig, Trostberg (DE); Bernhard Sachsenhauser, Trostberg (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/023,268

(22) PCT Filed: Aug. 25, 2021

(86) PCT No.: PCT/EP2021/073435
§ 371 (c)(1),
(2) Date: Feb. 24, 2023

(87) PCT Pub. No.: WO2022/043348
PCT Pub. Date: Mar. 3, 2022

(65) Prior Publication Data
US 2023/0303446 A1  Sep. 28, 2023
US 2024/0092697 A9  Mar. 21, 2024

(30) Foreign Application Priority Data
Aug. 26, 2020 (EP) ..................... 20192863

(51) Int. Cl.
C04B 28/26  (2006.01)
C04B 11/30  (2006.01)
(Continued)

(52) U.S. Cl.
CPC .............. *C04B 28/26* (2013.01); *C04B 11/30* (2013.01); *C04B 14/06* (2013.01); *C04B 24/06* (2013.01);
(Continued)

(58) Field of Classification Search
CPC ......... C04B 28/26; C04B 11/30; C04B 14/06; C04B 24/06; C04B 24/2652; C04B 28/04; C04B 28/14
See application file for complete search history.

(56) References Cited

U.S. PATENT DOCUMENTS 4,430,469 A   2/1984  Burge et al.
6,555,683 B1  4/2003  Weichmann et al.
(Continued)

FOREIGN PATENT DOCUMENTS

DE  602004011804 T2   2/2009
EP       3517516 A1 *  7/2019
(Continued)

OTHER PUBLICATIONS

"Ettringite Formation and the Performance of Concrete." Portland Cement Association, www.cement.org/docs/default-source/fc_concrete_technology/is417-ettringite-formation-and-the-performance-of-concrete.pdf?sfvrsn=412%26sfvrsn=412. Jan. 4, 2019. (Year: 2019).*

(Continued)

Primary Examiner — Jennifer A Smith
Assistant Examiner — Jeffrey Eugene Barzach
(74) Attorney, Agent, or Firm — CURATOLO SIDOTI & TRILLIS CO., LPA; Salvatore Sidoti; Floyd Trillis, III

(57) ABSTRACT

A cement-reduced construction composition comprises a) a cementitious binder comprising one or more calcium silicate mineral phases and one or more calcium aluminate mineral phases, and having a Blaine surface area of at least 3800

(Continued)

$cm^2/g$; b) a fine material having a Dv90 of less than 200 µm, selected from alkali-activatable binders, rock powders and inorganic pigments, or mixtures thereof; c) optionally, an extraneous aluminate source; d) a sulfate source; and e) a polyol. The composition contains a controlled amount of available aluminate, calculated as $Al(OH)_4^-$, from the calcium aluminate mineral phases plus the optional extraneous aluminate source; and the molar ratio of total available aluminate to sulfate is 0.4 to 2.0. The construction composition further comprises f) an ettringite formation controller and g) a co-retarder. The cement-reduced construction composition is a reduced carbon footprint construction composition and exhibits high early strength, high final strength, sufficient open time, high durability, and reduced shrinkage compared to ordinary Portland cement based mixes.

26 Claims, 1 Drawing Sheet

(51) Int. Cl.
| | |
|---|---|
| *C04B 14/06* | (2006.01) |
| *C04B 24/06* | (2006.01) |
| *C04B 24/26* | (2006.01) |
| *C04B 28/04* | (2006.01) |
| *C04B 28/14* | (2006.01) |

(52) U.S. Cl.
CPC .......... *C04B 24/2652* (2013.01); *C04B 28/04* (2013.01); *C04B 28/14* (2013.01)

(56) References Cited

U.S. PATENT DOCUMENTS

| | | | | |
|---|---|---|---|---|
| 2007/0074642 | A1 | 4/2007 | Amathieu | |
| 2013/0098271 | A1* | 4/2013 | Eberwein | C04B 28/06 |
| | | | | 106/806 |
| 2013/0333593 | A1* | 12/2013 | Yoshinami | C04B 24/02 |
| | | | | 106/696 |
| 2017/0197883 | A1* | 7/2017 | Hoornaert | C04B 7/19 |

FOREIGN PATENT DOCUMENTS

| | | | |
|---|---|---|---|
| WO | 2012/133870 A1 | 10/2012 | |
| WO | 2017/212045 A1 | 12/2017 | |
| WO | 2019/077050 A1 | 4/2019 | |
| WO | WO-2019077050 A1 * | 4/2019 | ............. C04B 14/26 |

OTHER PUBLICATIONS

"Milke—Special Cements for Construction Chemistry and Dry Mortars." Heidelberg Cement, www.heidelbergmaterials.de/sites/default/files/assets/document/18/c2/milke_construction_chemistry_dry_mortars_web.pdf. Accessed Aug. 11, 2023. (Year: 2023).*
"CEM I 52,5 R—Milke Premium." Heidelberg Materials, www.heidelbergmaterials.de/sites/default/files/2023-05/GEM_1%205%20R_Milke%20premium_TM_2023%2005%2031_GB.pdf. Accessed Aug. 11, 2023. (Year: 2023).*
Kantapadhi, Surya. "4 Primary Cement Compounds Their Roles." CivilBlog.Org, Jul. 14, 2017, civilblog.org/2017/07/14/4-primary-cement-compounds-roles/. (Year: 2017).*
"Points to Be Considered for Effective Storage of Cement." Civil Ease, Aug. 6, 2020, www.civilease.com/2020/08/storage-of-cement.html. (Year: 2020).*
S.A. Abo-El-Enein, et al., "Early hydration characteristics of oil well cement pastes admixed with newly prepared organic admixture", HBRC Journal, Aug. 1, 2018, vol. 14, No. 2.
Jochen Stark, et al., "Zement & Kalk: Der Baustoff Als Werkstoff" Jan. 1, 2000.
Frank Etzler, "Particle size analysis: a Comparative Study of Various Methods", pp. 217-224, Jan. 1, 1995.
Frank Etzler, "Particle size analysis: a Comparative Study of Various Methods II", pp. 278-282, vol. 14, Jan. 1, 1997, vol. 14.
International Search Report for Application No. PCT/EP2021/073435, dated Aug. 25, 2021.
International Written Opinion for No. PCT/EP2021/073435, dated Aug. 25, 2021.

* cited by examiner

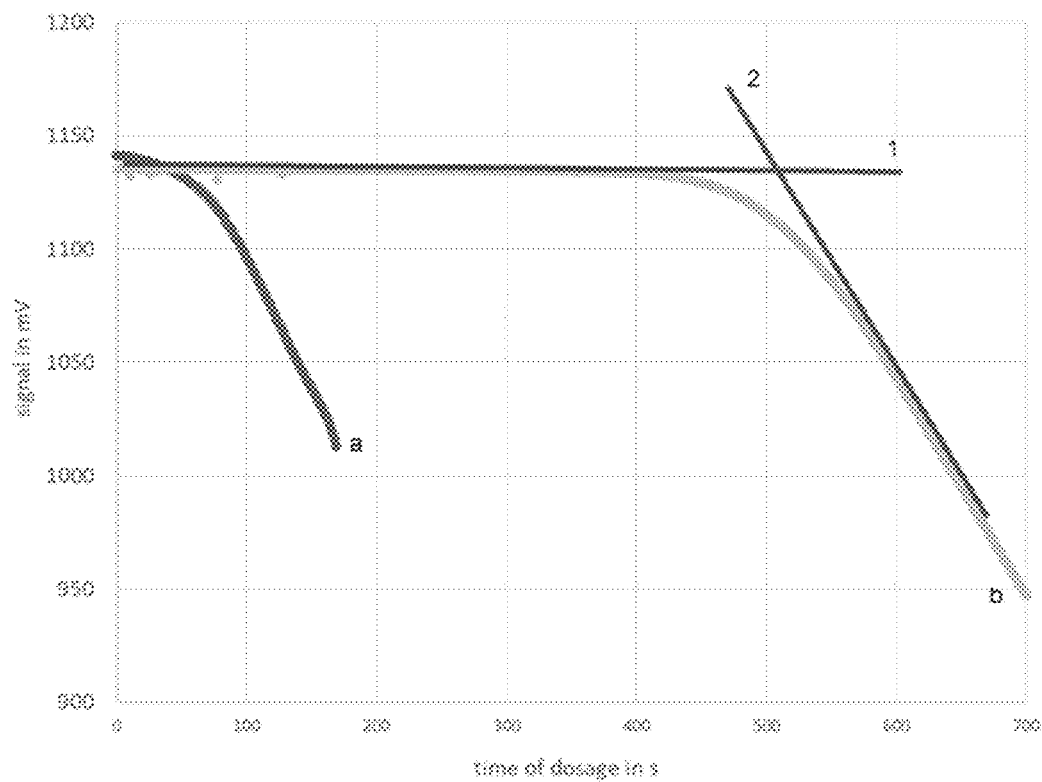

CEMENT-REDUCED CONSTRUCTION COMPOSITION

CROSS REFERENCE TO RELATED APPLICATIONS

This application is a national stage application of International Application No. PCT/EP2021/073435, filed 25 Aug. 2021, which claims priority from European Patent Application No. 20192863.7, filed 26 Aug. 2020, both of which applications are incorporated herein by reference.

The present invention relates to a cement-reduced construction composition and an aqueous cement- and water-reduced freshly mixed construction composition for, e.g., application as precast concrete, with high early strength.

Concrete is the most widely used engineering material in the world. Concrete is a term that refers to a composite material of a binding medium having particles or fragments of aggregate embedded therein. In most construction concretes currently employed, the binding medium is formed from a mixture of a hydraulic cement and water.

Prefabricated elements of concrete, such as modular building structures, are obtained by mixing materials including a cement, an aggregate, water, and a dispersant, molding in various molds, and curing. Because the mold is repeatedly used many times, from the viewpoint of productivity and for enhancing the turnover rate of the mold, it is important for the concretes to exhibit high early strength.

Most hydraulic cements employed today are based upon Portland cement. Portland cement is made primarily from certain clay minerals, limestone and gypsum, in a high temperature process that drives off carbon dioxide and chemically combines the primary ingredients into new compounds. Because carbon dioxide is generated by both the cement production process itself, as well as by energy plants that generate power to run the production process, cement production is currently a leading source of current carbon dioxide atmospheric emissions.

As global warming and ocean acidification become an increasing problem and the desire to reduce carbon dioxide gas emissions (a principal cause of global warming) continues, the cement production industry will fall under increased scrutiny. Moreover, cement plants produce other pollutants like $NO_x$, $SO_x$, VOCs, particulates and mercury. Cement plants also produce cement kiln dust, which must sometimes be land filled, often in hazardous materials landfill sites.

It is desirable to provide a construction composition with reduced carbon footprint without compromising critical properties such as open time, high early strength, high final strength, and durability.

WO 2012/133870 A1 discloses a method for producing a cured article of a hydraulic composition, comprising the steps of preparing a hydraulic composition by mixing glycerol, cement and water, the hydraulic composition comprising sulfate ions in a certain ratio; and aging and curing the hydraulic composition.

It is known that dispersants are added to aqueous slurries of hydraulic binders for improving their workability, i.e. kneadability, spreadability, sprayability, pumpability or flowability. Such admixtures are capable of preventing the formation of solid agglomerates, and of dispersing the particles already present as well as those newly formed by hydration, and in this way improving the workability. In order to convert the pulverulent binders into a freshly mixed processible form, substantially more mixing water is required than would be necessary for the subsequent hydration and hardening process. The voids formed in the concrete body by the excess of water, which subsequently evaporates, lead to poor mechanical strength and resistance. In order to reduce the excess proportion of water at a predetermined processing consistency and/or to improve the workability at a predetermined water/binder ratio, admixtures are used which are generally referred to as water-reducing agents or plasticizers.

Upon hydration of a cementitious system, ettringite is generated in a rapid reaction. Ettringite is a calcium aluminum sulfate compound having the formula $Ca_6Al_2(SO_4)_3 \cdot 32\,H_2O$ or alternatively $3\,CaO \cdot Al_2O_3 \cdot 3\,CaSO_4 \cdot 32\,H_2O$. This reaction is among others responsible for the setting and the development of early compressive strength of the cementitious composition. Ettringite forms as long needle-like crystals. The newly formed small needle-like ettringite crystals, however, tend to deteriorate the workability or flowability of the cementitious composition. In addition, ettringite contains 32 moles of water in its stoichiometric formula. This means that upon ettringite formation, a significant amount of water is bound in the solid crystals. A further quantity of water is adsorbed at the newly developing ettringite surfaces. As a result, the flowability of the composition is reduced.

WO 2019/077050 A1 discloses a set control composition for cementitious systems comprising a) an amine-glyoxylic acid condensate, and b) at least one of (i) a borate source and (ii) a carbonate source. The composition is said to suppress the formation of ettringite from the aluminate phases and to inhibit the crystallization of ettringite. In view of the retarding action of the set control composition, the dosage of dispersant(s) necessary to obtain a given flowability of the cementitious system can be reduced.

The present invention therefore seeks to provide a reduced carbon footprint construction composition exhibiting high early strength, high final strength, sufficient open time, high durability, and reduced shrinkage compared to ordinary Portland cement based mixes. Ingredients of the construction composition should be abundantly available.

The above problem is solved by a cement-reduced construction composition comprising
a) a cementitious binder comprising one or more calcium silicate mineral phases and one or more calcium aluminate mineral phases, and having a Blaine surface area of at least 3800 cm$^2$/g, in an amount of 180 to 400 kg per m$^3$ of the freshly mixed construction composition;
b) a fine material having a Dv90 of less than 200 μm, selected from alkali-activatable binders, rock powders and inorganic pigments, or mixtures thereof, in a total amount of 20 to 200 parts by weight, relative to 100 parts by weight of cementitious binder a);
c) optionally, an extraneous aluminate source;
d) a sulfate source; and
e) a polyol in an amount of 0.3 to 2.5 wt.-%, relative to the amount of cementitious binder a);
wherein the composition contains available aluminate, calculated as $Al(OH)_4^-$, from the calcium aluminate mineral phases plus the optional extraneous aluminate source, per 100 g of cementitious binder a), in a total amount of
at least 0.08 mol, if the amount of cementitious binder a) is in the range of 180 to less than 220 kg per m$^3$ of the freshly mixed composition,
at least 0.06 mol, if the amount of cementitious binder a) is in the range of 220 to less than 280 kg per m$^3$ of the freshly mixed composition, and at least 0.05 mol, if the amount of cementitious binder a) is 280 kg or more per m³ of the freshly mixed composition;

and the molar ratio of total available aluminate to sulfate is 0.4 to 2.0;

the construction composition further comprising f) an ettringite formation controller comprising (i) glyoxylic acid, a glyoxylic acid salt and/or a glyoxylic acid derivative; and (ii) at least one of (ii-a) a borate source and (ii-b) a carbonate source, wherein the carbonate source is selected from inorganic carbonates having an aqueous solubility of 0.1 g·L$^{-1}$ or more, organic carbonates, and mixtures thereof; and g) a co-retarder selected from (g-1) α-hydroxy monocarboxylic acids and salts thereof, (g-2) phosphonic acids and salts thereof, (g-3) polycarboxylic acids and salts thereof, and mixtures thereof.

It has been found that part of the cementitious binder can be substituted for selected fine materials without compromising performance if certain parameters are observed. Hence, the invention allows for the provision of a construction composition comprising a reduced amount of cementitious binder, such as Ordinary Portland Cement, compared to typical concrete mixtures. The reduction of cementitious binder allows for a lower carbon footprint.

It has moreover been found that the cement-reduced construction composition allows for a freshly mixed construction composition with a reduced water-to-cementitious binder ratio (w/c) in comparison to traditional Portland cement based concrete mixes, while retaining or even improving the workability. The reduced w/c ratio allows for a faster bridging of cementitious binder and fine material particles. It is believed that the inventive compositions have a dense microstructure. Less water is available for calcium silicate hydrate formation, leading to increased early strength and better durability, e.g., freeze thaw resistance, carbonation resistance, higher resistivity and sulfate resistance.

The cementitious binder a) comprises one or more calcium silicate mineral phases and one or more crystalline calcium aluminate mineral phases.

Conveniently, the mineralogical phases are herein indicated by their cement notation. The primary compounds are represented in the cement notation by the oxide varieties: C for CaO, M for MgO, S for SiO$_2$, A for Al$_2$O$_3$, $ for SO$_3$, F for Fe$_2$O$_3$, and H for H$_2$O.

In general, the calcium silicate mineral phases and calcium aluminate mineral phases constitute at least 90 wt.-% of the cementitious binder a). Further, the calcium silicate mineral phases preferably constitute at least 60 wt.-% of the cementitious binder a), more preferably at least 65 wt.-%, most preferably 65 to 75 wt.-%.

Suitably, the calcium silicate mineral phases are selected from C3S (alite) and C2S (belite). The calcium silicate mineral phases provide primarily final strength properties.

Suitably, the calcium aluminate mineral phases are selected from C3A, C4AF and C12A7, in particular C3A and C4AF.

In an embodiment, the cementitious binder a) is Portland cement, in particular ordinary Portland cement (OPC). The term "Portland cement" denotes any cement compound containing Portland clinker, especially CEM I within the meaning of standard EN 197-1, paragraph 5.2. A preferred cement is ordinary Portland cement (OPC) according to DIN EN 197-1. The phases constituting Portland cement mainly are alite (C3S), belite (C2S), calcium aluminate (C3A), calcium ferroaluminate (C4AF) and other minor phases. Commercially available OPC may either contain calcium sulfate (<7 wt.-%) or is essentially free of calcium sulfate (<1 wt.-%).

The cementitious binder of the construction composition has a Blaine surface area of at least 3800 cm²/g, preferably at least 4500 cm²/g, most preferably at least 5000 cm²/g. The Blaine surface area is used as parameter for grinding fineness. Finer milling allows for higher reactivity. The Blaine surface area may be determined according to DIN EN 196-6.

Generally, the amount of cementitious binder a) in the construction composition is in the range of 8 to 20 wt.-%, preferably 10 to 18 wt.-%, relative to the solids content of the construction composition.

According to the invention, the construction composition contains available aluminate, calculated as Al(OH)$_4^-$, from the calcium aluminate mineral phases plus the optional extraneous aluminate source, per 100 g of cementitious binder a), in a total amount of at least 0.08 mol, if the amount of cementitious binder a) is in the range of 180 to less than 220 kg per m³ of the freshly mixed composition, at least 0.06 mol, if the amount of cementitious binder a) is in the range of 220 to less than 280 kg per m³ of the freshly mixed composition, and at least 0.05 mol, if the amount of cementitious binder a) is 280 kg or more per m³ of the freshly mixed composition.

The present inventors found that a reduction of the proportion of cementitious binder a) without compromising the desired properties is possible only by maintaining the amount of available aluminate within the above boundaries. Thus, the lower the proportion of cementitious binder a), the higher the required amount of available aluminate.

Generally, the construction composition contains 0.2 mol or less of total available aluminate, per 100 g of cementitious binder a).

It has been found that construction compositions containing available aluminate in the above minimum amounts exhibit optimum performance regarding open time before setting and early strength development. On the other hand, if the cementitious binder contains more than 0.2 mol of total available aluminate per 100 g of cementitious binder a), open time may be shorter as early strength development may be too fast.

Commonly, approximate proportions of the main minerals in Portland cement are calculated by the Bogue formula, which in turn is based on the elemental composition of the clinker determined, e.g., by means of X-ray fluorescence (XRF). Such methods provide the oxide composition of the elements. This means that the amount of Al is reported as Al$_2$O$_3$. It has been found that cements with apparently the same Al$_2$O$_3$ content exhibit quite different properties regarding early strength and controllability by hydration control. Cement includes very different sources of Al of mineralogical nature and solubility. The present inventors have found that not all Al is available or accessible for the formation of ettringite. Only Al-containing mineral phases with adequate solubility in the aqueous environment of the cement paste participate in the formation of ettringite. Other Al-containing minerals such as crystalline aluminum oxides, e.g. corundum, do not generate aluminate in aqueous environments, due to their limited solubility. Consequently, elemental analysis alone cannot provide reliable values for available aluminate.

Hence, the invention relies on the available aluminate, calculated as Al(OH)$_4^-$. "Available aluminate" is meant to encompass mineral phases and Al-containing compounds that are capable of generating $Al(OH)_4^-$ in alkaline aqueous environments. Calcium aluminate phases, such as C3A ($Ca_3Al_2O_6$), dissolve in an alkaline aqueous environment to yield $Al(OH)_4^-$ and $Ca^{2+}$ ions. For the purpose of this invention, the concentration of mineral phases and Al-containing compounds that are capable of generating $Al(OH)_4^-$ is expressed as mol of $Al(OH)_4^-$ per 100 g of cementitious binder a).

It is believed that the common calcium aluminate mineral phases—in contrast to crystalline aluminum oxides—are sources of available aluminate. Therefore, the amount of available aluminate in a given cementitious binder may be determined by methods capable of discriminating between the mineral phases constituting the cementitious binder. A useful method for this purpose is Rietveld refinement of an X-ray diffraction (XRD) powder pattern. This software technique is used to refine a variety of parameters, including lattice parameters, peak position, intensities and shape. This allows theoretical diffraction patterns to be calculated. As soon as the calculated diffraction pattern is almost identical to the data of an examined sample, precise quantitative information on the contained mineral phases can be determined.

Generally, calcium aluminate mineral phases capable of generating $Al(OH)_4^-$ in alkaline aqueous environments are tricalcium aluminate (C3A), monocalcium aluminate (CA), mayenite (C12A7), grossite (CA2), Q-phase (C20A13M3S3) or tetracalcium aluminoferrite (C4AF). For practical purposes, if the cementitious binder a) is Portland cement, it generally suffices to assess the following mineral phases only: tricalcium aluminate (C3A), monocalcium aluminate (CA), mayenite (C12A7) and tetracalcium aluminoferrite (C4AF), in particular tricalcium aluminate (C3A) and tetracalcium aluminoferrite (C4AF).

Alternatively, the amount of available aluminate may be obtained by determining the total amount of Al from the elemental composition of the cementitious binder a), e.g., by XRF, and subtracting therefrom the amount of crystalline aluminum compounds not capable of generating available aluminate, as determined by XRD and Rietveld refinement. This method also takes into account amorphous, soluble aluminum compounds capable of generating available aluminate. Such crystalline aluminum compounds not capable of generating available aluminates include compounds of the melilite group, e.g., gehlenite (C2AS), compounds of the spinel group, e.g., spinel (MA), mullite ($Al_2Al_{2+2x}Si_{2-2x}O_{10-x}$), and corundum ($Al_2O_3$).

In one embodiment, the invention makes use of selected cementitious binders containing sufficient amounts of available aluminate from calcium aluminate mineral phases, as determined by, e.g., XRD analysis, to meet the amounts specified above.

Alternatively, if the cementitious binder a) intrinsically contains an insufficient concentration of available aluminate per 100 g of cementitious binder a), an extraneous aluminate source c) can be added. Hence in some embodiments, the construction composition contains an extraneous aluminate source c).

The extraneous aluminate source c) provides available aluminate as defined above. Suitably, the extraneous aluminate source c) is selected from non-calciferous aluminate sources, such as aluminum(III) salts, aluminum(II) complexes, crystalline aluminum hydroxide, amorphous aluminum hydroxide; and calciferous aluminate sources such as high alumina cement, sulfoaluminate cement or synthetic calcium aluminate mineral phases.

Useful aluminum(II) salts are aluminum(II) salts which readily form $Al(OH)_4^-$ in an alkaline aqueous environment. Suitable aluminum(II) salts include, but are not limited to, aluminum halides, such as aluminum(III) chloride, and their corresponding hydrates, amorphous aluminum oxides, aluminum hydroxides or mixed forms thereof, aluminum sulfates or sulfate-containing aluminum salts, such as potassium alum, and their corresponding hydrates, aluminum nitrate, aluminum nitrite and their corresponding hydrates, aluminum complexes such as aluminum triformate, aluminum triacetate, aluminum diacetate and aluminum monoacetate, aluminum containing metal organic frameworks, e.g. aluminum fumarate, e.g. Basolite™ A520, and M(II)-aluminum-oxo-hydrates, e.g., hydrogarnet. Aluminum(III) hydroxides may be crystalline or amorphous. Preferably, amorphous aluminum hydroxide is used.

High aluminate cement means a cement containing a high concentration of calcium aluminate phases, e.g., at least 30 wt.-%. More precisely, said mineralogical phase of aluminate type comprises tricalcium aluminate (C3A), monocalcium aluminate (CA), mayenite (C12A7), tetracalcium aluminoferrite (C4AF), or a combination of several of these phases.

Sulfoaluminate cement has a content of ye'elimite (of chemical formula $4CaO·3Al_2O_3·SO_3$ or C4A3$ in cement notation) of typically greater than 15 wt.-%.

Suitable synthetic calcium aluminate mineral phases include amorphous mayenite (C12A7). The construction composition comprises a fine material b) having a Dv90 of less than 200 µm, preferably less than 150 µm, more preferably less than 70 µm, or less than 50 µm.

The Dv90 (by volume) corresponds to the $90^{th}$ percentile of the particle size distribution, meaning that 90% of the particles have a size of the Dv90 or smaller and 10% have a size larger than the Dv90. Generally, the Dv90 and other values of the same type are characteristic of the granulometric profile (volume distribution) of a collection of particles or grains. Conformity with the requirement that 90% of the particles have a size of 200 µm or less is ensured if at least 90% by volume of the particles pass a sieve having a mesh opening of 200 µm. Alternatively, the Dv90 may be calculated from a particle size distribution measured by static laser diffraction using a Malvern Mastersizer 2000.

The particle size distribution influences the packing density, which in turn influences water requirement and mechanical properties of the construction composition. The packing density of the construction composition and in particular of the fine material should be as high as possible to improve workability and reduce water demand. Generally, the grain size of the fine material b) ranges from 50 nm to 1 mm.

The construction composition comprises a fine material b) having a Dv90 of less than 200 µm, preferably less than 175 µm, more preferably less than 150 µm, selected from alkali-activatable binders, rock powders and inorganic pigments, or mixtures thereof, in a total amount of 50 to 200 parts by weight, relative to 100 parts by weight of cementitious binder a).

The term "alkali-activatable binder" is meant to designate materials which in an aqueous alkaline environment set in a cement-like fashion. The term encompasses materials that are commonly referred to as "latent hydraulic binders" and "pozzolanic binders".

For the purposes of the present invention, a "latent hydraulic binder" is preferably a binder in which the molar ratio $(CaO+MgO):SiO_2$ is from 0.8 to 2.5 and particularly from 1.0 to 2.0. In general terms, the above-mentioned latent hydraulic binders can be selected from industrial and/or synthetic slag, in particular from blast furnace slag, electrothermal phosphorous slag, steel slag and mixtures thereof. The "pozzolanic binders" can generally be selected from amorphous silica, preferably precipitated silica, fumed silica and microsilica, ground glass, metakaolin, aluminosilicates, fly ash, preferably brown-coal fly ash and hard-coal fly ash, natural pozzolans such as tuff, trass and volcanic ash, calcined clays, burnt shale, rice husk ash, natural and synthetic zeolites and mixtures thereof.

The slag can be either industrial slag, i.e. waste products from industrial processes, or else synthetic slag. The latter can be advantageous because industrial slag is not always available in consistent quantity and quality.

Blast furnace slag (BFS) is a waste product of the glass furnace process. Other materials are granulated blast furnace slag (GBFS) and ground granulated blast furnace slag (GGBFS), which is granulated blast furnace slag that has been finely pulverized. Ground granulated blast furnace slag varies in terms of grinding fineness and grain size distribution, which depend on origin and treatment method, and grinding fineness influences reactivity here.

For the purposes of the present invention, the expression "blast furnace slag" is however intended to comprise materials resulting from all of the levels of treatment, milling, and quality mentioned (i.e. BFS, GBFS and GGBFS). Blast furnace slag generally comprises from 30 to 45% by weight of CaO, about 4 to 17% by weight of MgO, about 30 to 45% by weight of $SiO_2$ and about 5 to 15% by weight of $Al_2O_3$, typically about 40% by weight of CaO, about 10% by weight of MgO, about 35% by weight of $SiO_2$ and about 12% by weight of $Al_2O_3$.

Electrothermal phosphorous slag is a waste product of electrothermal phosphorous production. It is less reactive than blast furnace slag and comprises about 45 to 50% by weight of CaO, about 0.5 to 3% by weight of MgO, about 38 to 43% by weight of $SiO_2$, about 2 to 5% by weight of $Al_2O_3$ and about 0.2 to 3% by weight of $Fe_2O_3$, and also fluoride and phosphate. Steel slag is a waste product of various steel production processes with greatly varying composition.

Amorphous silica is preferably an X ray-amorphous silica, i.e. a silica for which the powder diffraction method reveals no crystallinity. The content of $SiO_2$ in the amorphous silica of the invention is advantageously at least 80% by weight, preferably at least 90% by weight. Precipitated silica is obtained on an industrial scale by way of precipitating processes starting from water glass. Precipitated silica from some production processes is also called silica gel.

Fumed silica is produced via reaction of chlorosilanes, for example silicon tetrachloride, in a hydrogen/oxygen flame. Fumed silica is an amorphous $SiO_2$ powder of particle diameter from 5 to 50 nm with specific surface area of from 50 to 600 $m^2 \cdot g^{-1}$.

Microsilica is a by-product of silicon production or ferrosilicon production, and likewise consists mostly of amorphous $SiO_2$ powder. The particles have diameters of the order of magnitude of 0.1 μm. Specific surface area is of the order of magnitude of from 15 to 30 $m^2 \cdot g^{-1}$.

Metakaolin is produced when kaolin is dehydrated. Whereas at from 100 to 200° C. kaolin releases physically bound water, at from 500 to 800° C. a dehydroxylation takes place, with collapse of the lattice structure and formation of metakaolin ($Al_2Si_2O_7$). Accordingly pure metakaolin comprises about 54% by weight of $SiO_2$ and about 46% by weight of $Al_2O_3$.

Fly ash is produced inter alia during the combustion of coal in power stations. Class C fly ash (brown-coal fly ash) comprises according to WO 08/012438 about 10% by weight of CaO, whereas class F fly ash (hard-coal fly ash) comprises less than 8% by weight, preferably less than 4% by weight, and typically about 2% by weight of CaO.

In another embodiment, the fine material b) is selected from "rock powders". Rock powders consist of finely crushed rock and are abundantly available. Their use does not contribute significantly to the carbon footprint. Generally, rock powders include silicate or carbonate rock powder. Useful examples include limestone, such as ground limestone or precipitated limestone, dolomite, basalt, and quartz powder.

In another embodiment, the fine material b) is selected from an inorganic pigment. Suitable inorganic pigments include iron oxides, titanium dioxide, cobalt-chrome-aluminum-spinels, and chrome(III)-oxides such as chrome green. Preferably, inorganic pigments do not constitute more than 5 wt.-%, preferably not more than 3 wt.-%, of the total amount of cementitious binder a) and fine material b), with the remainder of the fine material b) being alkali-activated binders and/or rock powders.

In some embodiments, the fine material b) is constituted solely of alkali-activated binders and rock powders, or solely rock powders.

The construction composition comprises a sulfate source d). The sulfate source is a compound capable of providing sulfate ions in an alkaline aqueous environment. Generally, the sulfate source has an aqueous solubility of at least 0.6 $mmol \cdot L^{-1}$ at a temperature of 30° C. The aqueous solubility of the sulfate source is suitably determined in water with a starting pH value of 7.

Specifically, the molar ratio of total available aluminate to sulfate is in the range of 0.4 to 2.0, preferably 0.57 to 0.8, in particular about 0.67. This means that the mixing ratios in the composition are adjusted so that the highest possible proportion of ettringite is formed from the available aluminate.

As mentioned earlier, Portland cement in its commercially available form typically contains small amounts of a sulfate source. If the intrinsic amount of sulfate is unknown, it can be determined by methods familiar to the skilled person such as elemental analysis by XRF. As the sulfate source commonly used in the cement production, alkaline earth metal sulfates, alkali metal sulfates, or mixed forms thereof, such as gypsum, hemihydrate, anhydrite, arkanite, thenardite, syngenite, langbeinite, are typically crystalline, the amount thereof can also be determined by XRD. Both the intrinsic amount of sulfate and any added extraneous sulfate source are considered in the calculation of the molar ratio of total available aluminate to sulfate.

In general, the extraneous sulfate source may be a calcium sulfate source, preferably selected from calcium sulfate dihydrate, anhydrite, α- and β-hemihydrate, i.e. α-bassanite and β-bassanite, or mixtures thereof. Preferably the calcium sulfate source is α-bassanite and/or β-bassanite. Other sulfate sources are alkali metal sulfates like potassium sulfate or sodium sulfate.

It is envisaged that an additive can act as a source of both aluminate and sulfate, such as aluminum sulfate hexadecahydrate or aluminum sulfate octadecahydrate.

Preferably, the sulfate source d) is a calcium sulfate source. The calcium sulfate source is generally comprised in an amount of 3 to 20 wt.-%, preferably 10 to 15 wt.-%, relative to the amount of cementitious binder a).

According to the invention, the construction composition contains an ettringite formation controller f). The ettringite formation controller comprises (i) glyoxylic acid, a glyoxylic acid salt and/or a glyoxylic acid derivative; and (ii) at least one of (ii-a) a borate source and (ii-b) a carbonate source. The carbonate source is selected from inorganic carbonates having an aqueous solubility of 0.1 g·L$^{-1}$ or more, organic carbonates, and mixtures thereof.

It is believed that the component (i), i.e., glyoxylic acid, a glyoxylic acid salt and/or a glyoxylic acid derivative, in combination with borate ions or carbonate ions from component (ii), retard the formation of ettringite from the aluminate phases originating from the cementitious binder.

Preferably, the (i) glyoxylic acid, glyoxylic acid salt and/or glyoxylic acid derivative is present in a total amount of 0.2 to 2 wt.-%, preferably 0.3 to 1 wt.-%, relative to the amount of cementitious binder a).

Useful glyoxylic acid salts include alkali metal glyoxylates, e.g., sodium glyoxylate and potassium glyoxylate.

Useful glyoxylic acid derivatives include glyoxylic acid polymers and glyoxylic acid adducts.

In an embodiment, the glyoxylic acid polymer is an amine-glyoxylic acid condensate. The term "amine-glyoxylic acid condensate" is intended to mean a condensate of glyoxylic acid with a compound containing amino or amido groups reactive with aldehydes. Examples of compounds containing aldehyde-reactive amino or amido groups include urea, thiourea, melamine, guanidine, acetoguanamine, benzoguanamine and other acylguanamines and polyacrylamide.

Preferably, the amine-glyoxylic acid condensate is a melamine-glyoxylic acid condensate, a urea-glyoxylic acid condensate, a melamine-urea-glyoxylic acid condensate and/or a polyacrylamide-glyoxylic acid condensate. Urea-glyoxylic acid condensates are particularly preferred. Useful amine-glyoxylic acid condensates and their manufacture are described in WO 2019/077050, incorporated by reference herein.

The amine-glyoxylic acid condensates are obtainable by reacting glyoxylic acid with a compound containing aldehyde-reactive amino or amido groups. The glyoxylic acid can be used as an aqueous solution or as glyoxylic acid salts, preferably glyoxylic acid alkali metal salts. Likewise, the amine compound can be used as salt, for example as guanidinium salts. In general, the amine compound and the glyoxylic acid are reacted in a molar ratio of 0.5 to 2 equivalents, preferably 1 to 1.3 equivalents, of glyoxylic acid per aldehyde-reactive amino or amido group. The reaction is carried out at a temperature of 0 to 120° C., preferably 25 to 105° C. The pH value is preferably from 0 to 8. The viscous products obtained in the reaction can be used as such, adjusted to a desired solids content by dilution or concentration or evaporated to dryness by, e.g., spray-drying, drum-drying, or flash-drying.

In general, the amine-glyoxylic acid condensates have molecular weights in the range of from 500 to 25 000 g/mol, preferably 1000 to 10 000 g/mol, particularly preferred 1000 to 5000 g/mol.

A useful glyoxylic acid adduct is a glyoxylic acid bisulfite adduct of formula

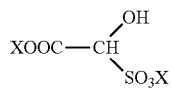

wherein

X is, independently of one another, selected from H or a cation equivalent Cat$_a$ wherein Cat is a cation not especially limited, but preferably selected from an alkali metal, alkaline earth metal, zinc, iron, ammonium, or phosphonium cation, or mixtures thereof and a is 1/n wherein n is the valence of the cation. The glyoxylic acid bisulfite adduct can be prepared as described in WO 2017/212045.

While glyoxylic acid and glyoxylic acid salts are solids, the glyoxylic acid condensates generally are liquids at ambient conditions. This can facilitate homogeneous distribution within the composition.

Component (ii) is at least one of (ii-a) a borate source and (ii-b) a carbonate source.

The borate source usually comprises a rapidly soluble, inexpensive, borate compound. Suitable borate sources include borax, boric acid, colemanite, and hexahydroborate.

If used, the (ii-a) borate source is preferably present in an amount of 0.3 to 1 wt.-%, preferably 0.3 to 0.5 wt.-%, relative to the amount of cementitious binder a).

The carbonate source may be an inorganic carbonate having an aqueous solubility of 0.1 g·L$^{-1}$ or more at 25° C. The aqueous solubility of the inorganic carbonate is suitably determined in water with a starting pH value of 7. It is understood that the pH value at the solubility limit is higher than the starting pH value.

In a preferred embodiment, the ettringite formation controller comprises (ii-b) a carbonate source. The presence of the carbonate source ensures that the mixing water is initially highly concentrated in carbonate ions. Carbonate ions are believed to adsorb onto mineral phase surfaces along with glyoxylic acid, glyoxylic acid salts and glyoxylic acid derivatives. The latter will also partly remain in the pore solution and initially prevent ettringite to be formed.

Preferably, the (ii-b) carbonate source is present in an amount of 0.3 to 1 wt.-%, preferably 0.3 to 0.5 wt.-%, relative to the amount of cementitious binder a).

The carbonate source may be an inorganic carbonate having an aqueous solubility of 0.1 g·L$^{-1}$ or more.

The "inorganic carbonate" is intended to mean a salt of carbonic acid, i.e., a salt which is characterized by the presence of a carbonate ion ($CO_3^{2-}$) and/or hydrogen carbonate ion ($HCO_3^-$).

In an embodiment, the inorganic carbonate may be suitably selected from alkali metal carbonates such as potassium carbonate, sodium carbonate, sodium bicarbonate, or lithium carbonate, and alkaline earth metal carbonates satisfying the required aqueous solubility, such as magnesium carbonate. Further suitable inorganic carbonates include carbonates of nitrogenous bases such as guanidinium carbonate und ammonium carbonate. Sodium carbonate and sodium bicarbonate are especially preferred, in particular sodium bicarbonate.

Alternatively, the carbonate source is selected from organic carbonates. "Organic carbonate" denotes an ester of carbonic acid. The organic carbonate is hydrolyzed in the presence of the cementitious system to release carbonate ions. In an embodiment, the organic carbonate is selected from ethylene carbonate, propylene carbonate, glycerol carbonate, dimethyl carbonate, di(hydroxyethyl)carbonate or a mixture thereof, preferably ethylene carbonate, propylene carbonate, and glycerol carbonate or a mixture thereof, and in particular ethylene carbonate and/or propylene carbonate. Mixtures of inorganic carbonates and organic carbonates can as well be used.

The weight ratio of component (i) to component (ii) is typically in the range of about 10:1 to about 1:10, preferably about 5:1 to about 1:5 or about 1:1 to about 1:4.

According to the invention, the construction composition contains a polyol e) in an amount of 0.3 to 2.5 wt.-%, preferably 1.5 to 2.5 wt.-%, relative to the amount of cementitious binder a).

It is believed that polyols such as glycerol chelate calcium ions of e.g. calcium sulfate or C3A. As a result, calcium ion dissociation is accelerated. Chelation of calcium ions also stabilizes calcium in solution and accelerates the dissolution of calcium aluminate phases, thereby rendering aluminate from these calcium aluminate phases more accessible.

"Polyol" is intended to denote a compound having at least two alcoholic hydroxyl groups in its molecule, for example 3, 4, 5 or 6 alcoholic hydroxyl groups. Polyols having vicinal hydroxyl groups are preferred. Polyols having at least three hydroxyl groups bound to three carbon atoms in sequence are most preferred.

The ability of the polyol to chelate calcium ions and thereby stabilize calcium in solution can be assessed by a calcium aluminate precipitation test. In an embodiment, the polyol, in a calcium aluminate precipitation test in which a test solution, obtained by supplementing 400 mL of a 1 wt.-% aqueous solution of the polyol with 20 mL of a 1 mol/L NaOH aqueous solution and 50 mL of a 25 mmol/L NaAlO$_2$ aqueous solution, is titrated with a 0.5 mol/L CaCl$_2$ aqueous solution at 20° C., inhibits precipitation of calcium aluminate up to a calcium concentration of 75 ppm, preferably 90 ppm.

The test detects the precipitation of calcium aluminate by turbidity. Initially, the test solution is a clear solution. The clear test solution is titrated with a CaCl$_2$ aqueous solution at a constant dosage rate of, e.g., 2 mL/min, as described above. With ongoing addition of CaCl$_2$, precipitation of calcium aluminate results in a change of the optical properties of the test solution by turbidity. The titration endpoint, expressed as the maximum calcium concentration (as Ca$^{2+}$), before the onset of turbidity can be calculated from the elapsed time to the onset point.

In a preferred embodiment, the polyol e) is selected from compounds consisting of carbon, hydrogen, and oxygen only and does not contain a carboxyl group (COOH) in its molecule.

In an embodiment, the polyol is selected from monosaccharides, oligosaccharides, water-soluble polysaccharides, compounds of general formula (P-I) or dimers or trimers of compounds of general formula (P-I):

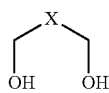

(P-I)

wherein X is

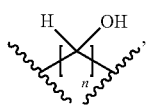

(P-Ia)

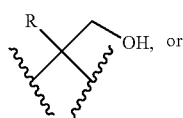

(P-Ib)

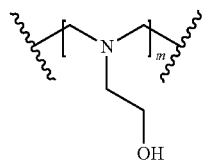

(P-Ic)

wherein
R is —CH$_2$OH, —NH$_2$,
n is an integer from 1 to 4,
m is an integer from 1 to 8.

In one embodiment, the polyol e) is selected from saccharides. Useful saccharides include monosaccharides, such as glucose and fructose; disaccharides, such as lactose and sucrose; trisaccharides, such as raffinose; and water-soluble polysaccharides, such as amylose and maltodextrins. Monosaccharides and Disaccharides, in particular sucrose, are especially preferred.

In another preferred embodiment, the polyol e) is selected from compounds consisting of carbon, hydrogen, and oxygen only and contains neither a carboxyl group (COOH) nor a carbonyl group (C=O) in its molecule. It is understood that the term "carbonyl group" encompasses the tautomeric form of the C=O group, i.e. a pair of doubly bonded carbon atoms adjacent to a hydroxyl group (—C=C(OH)—).

Compounds of formula (P-I) wherein X is (P-Ia) are generally referred to as sugar alcohols. Sugar alcohols are organic compounds, typically derived from sugars, containing one hydroxyl group (—OH) attached to each carbon atom. Useful sugar alcohols are mannitol, sorbitol, xylitol, arabitol, erythritol and glycerol. Among these, glycerol is particularly preferred. It is envisaged that carbonates of polyhydric alcohols such as glycerol carbonate can act as a polyol source.

Compounds of formula (P-I) wherein X is (P-Ib) include pentaerythritol, and tris(hydroxymethyl)aminomethane.

Compounds of formula (P-I) wherein X is (P-Ic) include triethanolamine.

Dimers or trimers denote compounds wherein two or three molecules of general formula (P-I) are linked via an ether bridge and which are formally derived from a condensation reaction with elimination of one or two molecules of water. Examples of dimers and trimers of compounds of formula (P-I) include dipentaerythritol and tripentaerythritol.

According to the invention, the construction composition comprises a co-retarder g) selected from (g-1) α-hydroxy monocarboxylic acids and salts thereof, (g-2) phosphonic acids and salts thereof, (g-3) polycarboxylic acids and salts thereof, and mixtures thereof. In a particularly preferred embodiment, the co-retarder g) comprises (g-1) α-hydroxy monocarboxylic acids and/or salts thereof.

Preferably, the co-retarder g) is present in a total amount of 0.05 to 1 wt.-%, preferably 0.05 to 0.2 wt.-%, relative to the amount of cementitious binder a).

Suitable α-hydroxy monocarboxylic acids or salts thereof (g$^{-1}$) include glycolic acid, gluconic acid, and their salts and mixtures thereof. Sodium gluconate is particularly preferred.

Suitable phosphonic acids and salts thereof (g-2) are in particular polyphosphonic acids and salts thereof and include 1-hydroxyethylidene-1,1-diphosphonic acid (HEDP), amino-tris(methylenephosphonic acid) (ATMP) or [[(2-hydroxyethyl)imino]bis(methylene)]-bisphosphonic acid, and their salts and mixtures thereof. The respective chemical formulae of the preferred di- or triphosphonates are given in the following:

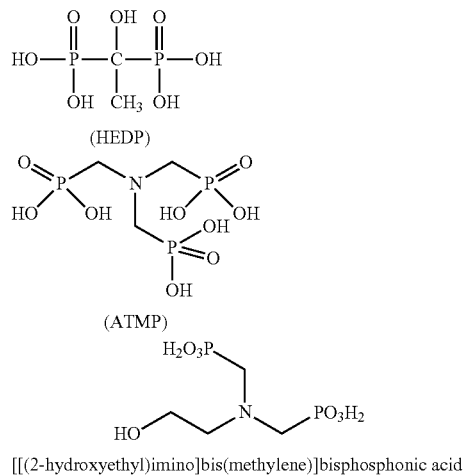

(HEDP)

(ATMP)

[[(2-hydroxyethyl)imino]bis(methylene)]bisphosphonic acid

Suitable polycarboxylic acids and salts thereof (g-3) include phosphonoalkyl carboxylic acids, amino carboxylic acids, and polymeric carboxylic acids, and their salts and mixtures thereof.

By the term polycarboxylic acid, as used herein, is meant a compound or polymer having two or more carboxyl groups to the molecule.

Suitable polycarboxylic acids include low molecular weight polycarboxylic acids (having a molecular weight of, e.g., 500 or lower), in particular aliphatic polycarboxylic acids, such as oxalic acid, malonic acid, succinic acid, glutaric acid, adipic acid, pimelic acid, fumaric acid, maleic acid, itaconic acid, citraconic acid, mesaconic acid, malic acid, tartaric acid, and citric acid.

Suitable phosphonoalkyl carboxylic acids include 1-phosphonobutane-1,2,4-tricarboxylic acid, 2-phosphonobutane-1,2,4-tricarboxylic acid, 3-phosphonobutane-1,2,4-tricarboxylic acid, 4-phosphonobutane-1,2,4-tricarboxylic acid, 2,4-diphosphonobutane-1,2,4-tricarboxylic acid, 2-phosphonobutane-1,2,3,4-tetracarboxylic acid, 1-methyl-2-phosphonopentane-1,2,4-tricarboxylic acid, or 1,2-phosphonoethane-2-dicarboxylic acid.

Suitable amino carboxylic acids include ethylenediamine tetra acetic acid, or nitrilotriacetic acid.

Suitable polymeric carboxylic acids include homopolymers of acrylic acid, homopolymers of methacrylic acid, polymaleic acid, copolymers such as ethylene/acrylic acid copolymer and ethylene/methacrylic acid copolymer; copolymers of acrylic acid and/or methacrylic acid with sulfo or sulfonate group containing monomers. In an embodiment, the sulfo or sulfonate group containing monomers are selected from the group of vinylsulfonic acid, (meth)allylsulfonic acid, 4-vinylphenylsulfonic acid or 2-acrylamido-2-methylpropyisulfonic acid (ATBS), with ATBS being particularly preferred. It is possible that one more of the before mentioned sulfo or sulfonate group containing monomers are contained in the copolymers.

In general, the molecular weight of the polymeric carboxylic acids is in the range of from 1000 to 30000 g/mol, preferably 1000 to 10 000 g/mol. The molecular weight is measured by the gel permeation chromatography method (GPC) as indicated in detail in the experimental part.

Suitably, the polymeric carboxylic acid or salt thereof has a milliequivalent number of carboxyl groups of 3.0 meq/g or higher, preferably 3.0 to 17.0 meq/g, more preferably 5.0 to 17.0 meq/g, most preferably 5.0 to 14.0 meq/g, assuming all the carboxyl groups to be in unneutralized form.

Although not preferred, the construction composition may comprise setting accelerators as conventionally used, e.g., in repair mortars and self-levelling underlayments, such as lithium salts, in particular lithium carbonate or lithium sulfate. It is an advantageous feature of the invention that the early strength development of the construction composition is such that lithium setting accelerators can be dispensed with. Hence, in preferred embodiments, the construction composition does not contain a lithium setting accelerator. This also serves to reduce the cost of the construction composition, as lithium setting accelerators are quite costly ingredients.

Preferably, the construction composition according to the invention additionally comprises at least one dispersant for inorganic binders, especially a dispersant for cementitious mixtures like concrete or mortar.

Examples of useful dispersants include comb polymers having a carbon-containing backbone to which are attached pendant cement-anchoring groups and polyether side chains, non-ionic comb polymers having a carbon-containing backbone to which are attached pendant hydrolysable groups and polyether side chains, the hydrolysable groups upon hydrolysis releasing cement-anchoring groups, colloidally disperse preparations of polyvalent metal cations, such as $Al^{3+}$, $Fe^{3+}$ or $Fe^{2+}$, and a polymeric dispersant which comprises anionic and/or anionogenic groups and polyether side chains, and the polyvalent metal cation is present in a superstoichiometric quantity, calculated as cation equivalents, based on the sum of the anionic and anionogenic groups of the polymeric dispersant, sulfonated melamine-formaldehyde condensates, lignosulfonates, sulfonated ketone-formaldehyde condensates, sulfonated naphthalene-formaldehyde condensates, phosphonate containing dispersants, phosphate containing dispersants, and mixtures thereof.

Preferably, the dispersant is present in a total amount of 0.08 to 0.4 wt.-%, preferably 0.15 to 0.3 wt.-%, relative to the amount of cementitious binder a).

Comb polymers having a carbon-containing backbone to which are attached pendant cement-anchoring groups and polyether side chains are particularly preferred. The cement-anchoring groups are anionic and/or anionogenic groups such as carboxylic groups, phosphonic or phosphoric acid groups or their anions. Anionogenic groups are the acid groups present in the polymeric dispersant, which can be transformed to the respective anionic group under alkaline conditions.

Preferably, the structural unit comprising anionic and/or anionogenic groups is one of the general formulae (Ia), (Ib), (Ic) and/or (Id):

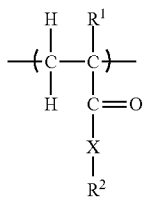

Ia wherein
$R^1$ is H, $C_1$-$C_4$ alkyl, $CH_2COOH$ or $CH_2CO$—X—$R^{3A}$, preferably H or methyl;
X is NH—$(C_{n1}H_{2n1})$ or O—$(C_{n1}H_{2n1})$ with n1=1, 2, 3 or 4, or a chemical bond, the nitrogen atom or the oxygen atom being bonded to the CO group;
$R^2$ is OM, $PO_3M_2$, or O-$PM_3M_2$; with the proviso that X is a chemical bond if $R^2$ is OM;
$R^{3A}$ is $PO_3M_2$, or O—$PO_3M_2$;

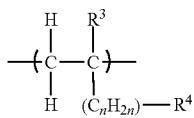

Ib wherein
$R^3$ is H or $C_1$-$C_4$ alkyl, preferably H or methyl;
n is 0, 1, 2, 3 or 4;
$R^4$ is $PO_3M_2$, or O—$PO_3M_2$;

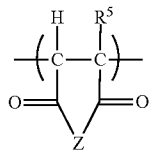

Ic wherein
$R^5$ is H or $C_1$-$C_4$ alkyl, preferably H;
Z is O or $NR^7$;
$R^7$ is H, $(C_{n1}H_{2n1})$—OH, $(C_{n1}H_{2n1})$—$PO_3M_2$, $(C_{n1}H_{2n1})$—$OPO_3M_2$, $(C_6H_4)$—$PO_3M_2$, or $(C_6H_4)$—$OPO_3M_2$, and
n1 is 1, 2, 3 or 4;

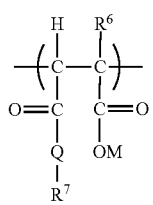

Id wherein
$R^6$ is H or $C_1$-$C_4$ alkyl, preferably H;
Q is $NR^7$ or O;
$R^7$ is H, $(C_{n1}H_{2n1})$—OH, $(C_{n1}H_{2n1})$—$PO_3M_2$, $(C_{n1}H_{2n1})$—$OPO_3M_2$, $(C_6H_4)$—$PO_3M_2$, or $(C_6H_4)$—$OPO_3M_2$,
n1 is 1, 2, 3 or 4; and
where each M independently is H or a cation equivalent.

Preferably, the structural unit comprising a polyether side chain is one of the general formulae (IIa), (IIb), (IIc) and/or (IId):

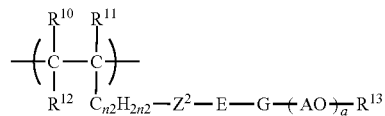

IIa wherein
$R^{10}$, $R^{11}$ and $R^{12}$ independently of one another are H or $C_1$-$C_4$ alkyl, preferably H or methyl;
$Z^2$ is O or S;
E is $C_2$-$C_6$ alkylene, cyclohexylene, $CH_2$—$C_6H_{10}$, 1,2-phenylene, 1,3-phenylene or 1,4-phenylene;
G is O, NH or CO—NH; or
E and G together are a chemical bond;
A is $C_2$-$C_5$ alkylene or $CH_2CH(C_6H_5)$, preferably $C_2$-$C_3$ alkylene;
n2 is 0, 1, 2, 3, 4 or 5;
a is an integer from 2 to 350, preferably 10 to 150, more preferably 20 to 100;
$R^{13}$ is H, an unbranched or branched $C_1$-$C_4$ alkyl group, CO—$NH_2$ or $COCH_3$;

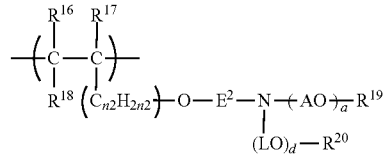

IIb wherein
$R^{16}$, $R^{17}$ and $R^{18}$ independently of one another are H or $C_1$-$C_4$ alkyl, preferably H;
$E^2$ is $C_2$-$C_6$ alkylene, cyclohexylene, $CH_2$—$C_6H_{10}$, 1,2-phenylene, 1,3-phenylene, or 1,4-phenylene, or is a chemical bond;
A is $C_2$-$C_5$ alkylene or $CH_2CH(C_6H_5)$, preferably $C_2$-$C_3$ alkylene;
n2 is 0, 1, 2, 3, 4 or 5;
L is $C_2$-$C_5$ alkylene or $CH_2CH(C_6H_5)$, preferably $C_2$-$C_3$ alkylene;
a is an integer from 2 to 350, preferably 10 to 150, more preferably 20 to 100;
d is an integer from 1 to 350, preferably 10 to 150, more preferably 20 to 100;
$R^{19}$ is H or $C_1$-$C_4$ alkyl; and
$R^{20}$ is H or $C_1$-$C_4$ alkyl;

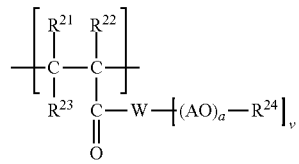

IIc wherein
$R^{21}$, $R^{22}$ and $R^{23}$ independently are H or $C_1$-$C_4$ alkyl, preferably H;
W is O, $NR^{25}$, or is N;
V is 1 if W=O or $NR^{25}$, and is 2 if W=N;

A is $C_2$-$C_5$ alkylene or $CH_2CH(C_6H_5)$, preferably $C_2$-$C_3$ alkylene;

a is an integer from 2 to 350, preferably 10 to 150, more preferably 20 to 100;

$R^{24}$ is H or $C_1$-$C_4$ alkyl;

$R^{25}$ is H or $C_1$-$C_4$ alkyl;

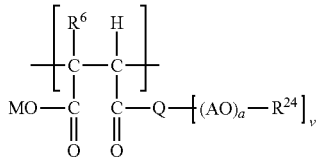

IId wherein
- $R^6$ is H or $C_1$-$C_4$ alkyl, preferably H;
- Q is $NR^{10}$, N or O;
- V is 1 if Q=O or $NR^{10}$ and is 2 if Q=N;
- $R^{10}$ is H or $C_1$-$C_4$ alkyl;
- A is $C_2$-$C_5$ alkylene or $CH_2CH(C_6H_5)$, preferably $C_2$-$C_3$ alkylene; and
- a is an integer from 2 to 350, preferably 10 to 150, more preferably 20 to 100;

where each M independently is H or a cation equivalent.

The molar ratio of structural units (I) to structural units (II) varies from 1:3 to about 10:1, preferably 1:1 to 10:1, more preferably 3:1 to 6:1. The polymeric dispersants comprising structural units (I) and (II) can be prepared by conventional methods, for example by free radical polymerization or controlled radical polymerization. The preparation of the dispersants is, for example, described in EP 0 894 811, EP 1 851 256, EP 2 463 314, and EP 0 753 488.

A number of useful dispersants contain carboxyl groups, salts thereof or hydrolysable groups releasing carboxyl groups upon hydrolysis. Preferably, the milliequivalent number of carboxyl groups contained in these dispersants (or of carboxyl groups releasable upon hydrolysis of hydrolysable groups contained in the dispersant) is lower than 3.0 meq/g, assuming all the carboxyl groups to be in unneutralized form.

More preferably, the dispersant is selected from the group of polycarboxylate ethers (PCEs). In PCEs, the anionic groups are carboxylic groups and/or carboxylate groups. The PCE is preferably obtainable by radical copolymerization of a polyether macromonomer and a monomer comprising anionic and/or anionogenic groups. Preferably, at least 45 mol-%, preferably at least 80 mol-% of all structural units constituting the copolymer are structural units of the polyether macromonomer or the monomer comprising anionic and/or anionogenic groups.

A further class of suitable comb polymers having a carbon-containing backbone to which are attached pendant cement-anchoring groups and polyether side chains comprise structural units (III) and (IV):

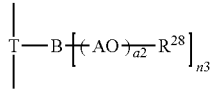

III wherein
- T is phenyl, naphthyl or heteroaryl having 5 to 10 ring atoms, of which 1 or 2 atoms are heteroatoms selected from N, O and S;
- n3 is 1 or 2;
- B is N, NH or O, with the proviso that n3 is 2 if B is N and n3 is 1 if B is NH or O;
- A is $C_2$-$C_5$ alkylene or $CH_2CH(C_6H_5)$, preferably $C_2$-$C_3$ alkylene;
- a2 is an integer from 1 to 300;
- $R^{26}$ is H, $C_1$-$C_{10}$ alkyl, $C_5$-$C_8$ cycloalkyl, aryl, or heteroaryl having 5 to 10 ring atoms, of which 1 or 2 atoms are heteroatoms selected from N, O and S;
- where the structural unit (IV) is selected from the structural units (IVa) and (IVb):

IVa wherein
- D is phenyl, naphthyl or heteroaryl having 5 to 10 ring atoms, of which 1 or 2 atoms are heteroatoms selected from N, O and S;
- $E^3$ is N, NH or O, with the proviso that m is 2 if $E^3$ is N and m is 1 if $E^3$ is NH or O;
- A is $C_2$-$C_5$ alkylene or $CH_2CH(C_6H_5)$, preferably $C_2$-$C_3$ alkylene;
- b is an integer from 0 to 300;
- M independently is H or a cation equivalent;

IVb wherein
- $V^2$ is phenyl or naphthyl and is optionally substituted by 1 or two radicals selected from $R^8$, OH, $OR^8$, $(CO)R^8$, COOM, $COOR^8$, $SO_3R^8$ and $NO_2$;
- $R^{7A}$ is COOM, $OCH_2COOM$, $SO_3M$ or $OPO_3M_2$;
- M is H or a cation equivalent; and
- $R^8$ is $C_1$-$C_4$ alkyl, phenyl, naphthyl, phenyl-$C_1$-$C_4$ alkyl or $C_1$-$C_4$ alkylphenyl.

Polymers comprising structural units (III) and (IV) are obtainable by polycondensation of an aromatic or heteroaromatic compound having a polyoxyalkylene group attached to the aromatic or heteroaromatic core, an aromatic compound having a carboxylic, sulfonic or phosphate moiety, and an aldehyde compound such as formaldehyde.

In an embodiment, the dispersant is a non-ionic comb polymer having a carbon-containing backbone to which are attached pendant hydrolysable groups and polyether side chains, the hydrolysable groups upon hydrolysis releasing cement-anchoring groups. Conveniently, the structural unit comprising a polyether side chain is one of the general formulae (IIa), (IIb), (IIc) and/or (IId) discussed above. The structural unit having pendant hydrolysable groups is preferably derived from acrylic acid ester monomers, more preferably hydroxyalkyl acrylic monoesters and/or hydroxyalkyl diesters, most preferably hydroxypropyl acrylate and/or hydroxyethyl acrylate. The ester functionality will hydrolyze to (deprotonated) acid groups upon exposure to water at preferably alkaline pH, which is provided by mixing the cementitious binder with water, and the resulting acid functional groups will then form complexes with the cement component.

In one embodiment, the dispersant is selected from colloidally disperse preparations of polyvalent metal cations, such as $Al^{3+}$, $Fe^{3+}$ or $Fe^{2+}$, and a polymeric dispersant which comprises anionic and/or anionogenic groups and polyether side chains. The polyvalent metal cation is present in a superstoichiometric quantity, calculated as cation equivalents, based on the sum of the anionic and anionogenic groups of the polymeric dispersant. Such dispersants are described in further detail in WO 2014/013077 A1, which is incorporated by reference herein.

Suitable sulfonated melamine-formaldehyde condensates are of the kind frequently used as plasticizers for hydraulic binders (also referred to as MFS resins). Sulfonated melamine-formaldehyde condensates and their preparation are described in, for example, CA2 172 004 A1, DE 44 1 1 797 A1, U.S. Pat. Nos. 4,430,469, 6,555,683 and CH 686 186 and also in Ullmann's Encyclopedia of Industrial Chemistry, 5th Ed., vol. A2, page 131, and Concrete Admixtures Handbook—Properties, Science and Technology, 2. Ed., pages 411, 412. Preferred sulfonated melamine-formaldehyde condensates encompass (greatly simplified and idealized) units of the formula

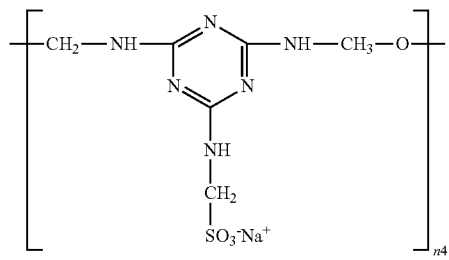

in which n4 stands generally for 10 to 300. The molar weight is situated preferably in the range from 2500 to 80 000. Additionally, to the sulfonated melamine units it is possible for other monomers to be incorporated by condensation. Particularly suitable is urea. Moreover, further aromatic units as well may be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. An example of melaminesulfonate-formaldehyde condensates are the Melment® products distributed by Master Builders Solutions Deutschland GmbH.

Suitable lignosulfonates are products which are obtained as by-products in the paper industry. They are described in Ullmann's Encyclopedia of Industrial Chemistry, 5th Ed., vol. A8, pages 586, 587. They include units of the highly simplified and idealizing formula

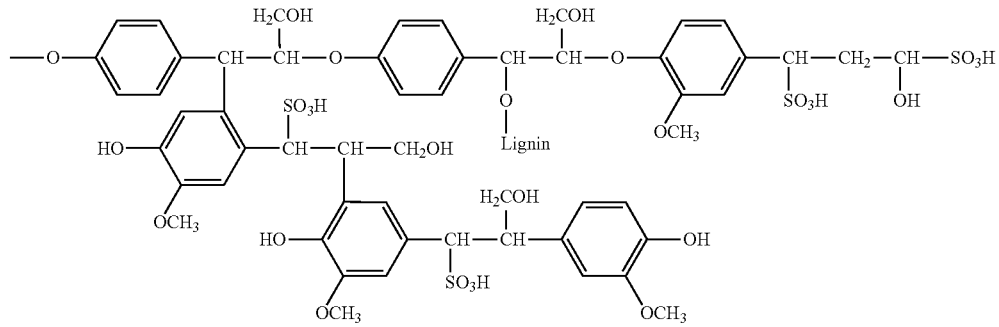

Lignosulfonates have molar weights of between 2000 and 100 000 g/mol. In general, they are present in the form of their sodium, calcium and/or magnesium salts. Examples of suitable lignosulfonates are the Borresperse products distributed by Borregaard LignoTech, Norway.

Suitable sulfonated ketone-formaldehyde condensates are products incorporating a monoketone or diketone as ketone component, preferably acetone, butanone, pentanone, hexanone or cyclohexanone. Condensates of this kind are known and are described in WO 2009/103579, for example. Sulfonated acetone-formaldehyde condensates are preferred. They generally comprise units of the formula (according to J. Plank et al., J. Appl. Poly. Sci. 2009, 2018-2024):

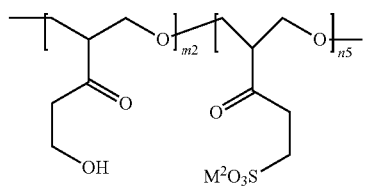

where m2 and n5 are generally each 10 to 250, $M^2$ is an alkali metal ion, such as $Na^+$, and the ratio m2:n5 is in general in the range from about 3:1 to about 1:3, more particularly about 1.2:1 to 1:1.2. Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. Examples of suitable sulfonated acetone-formaldehyde condensates are the Melcret K1L products distributed by Master Builders Solutions Deutschland GmbH.

Suitable sulfonated naphthalene-formaldehyde condensates are products obtained by sulfonation of naphthalene and subsequent polycondensation with formaldehyde. They are described in references including Concrete Admixtures Handbook—Properties, Science and Technology, 2. Ed., pages 411-413 and in Ullmann's Encyclopedia of Industrial Chemistry, 5th Ed., vol. A8, pages 587, 588. They comprise units of the formula

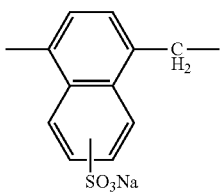

Typically, molar weights (Mw) of between 1000 and 50 000 g/mol are obtained. Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. Examples of suitable sulfonated β-naphthalene-formaldehyde condensates are the Melcret 500 L products distributed by Master Builders Solutions Deutschland GmbH.

Generally, phosphonate containing dispersants incorporate phosphonate groups and polyether side groups.

Suitable phosphonate containing dispersants are those according to the following formula

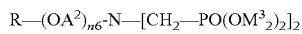

wherein
R is H or a hydrocarbon residue, preferably a $C_1$-$C_{15}$ alkyl radical,
$A^2$ is independently $C_2$-$C_{18}$ alkylene, preferably ethylene and/or propylene, most preferably ethylene,
n6 is an integer from 5 to 500, preferably 10 to 200, most preferably 10 to 100, and
$M^3$ is H, an alkali metal, ½ alkaline earth metal and/or an amine.

In an embodiment, the construction composition additionally comprises at least one aggregate h). The term "aggregate" is understood to relate to a filler material, i.e. an inert material which essentially does not form hydration products. The aggregate may be selected from quartz, sand, marble, e.g., crushed marble, glass spheres, granite, basalt, limestone, sandstone, calcite, marble, serpentine, travertine, dolomite, feldspar, gneiss, alluvial sands, and mixtures thereof. The packing density of the aggregates should be as high as possible and their particle size distribution ideally constitutes a fuller type sieve curve.

Aggregates may be classified by particle size. Fine aggregates, e.g., sand, generally have a diameter distribution of 150 µm to 5 mm. Coarse aggregates generally have a diameter distribution of more than 5 mm.

Preferably, the construction composition comprises less than 5 wt.-%, more preferably less than 3.5 wt.-%, most preferably less than 2 wt.-% of cementitious hydration products, relative to the total weight of the construction composition. It generally suffices to assess the following cementitious hydration products: ettringite, portlandite, syngenite. The presence and concentrations of these cementitious hydration products can be determined by Rietveld refinement of an X-ray diffraction (XRD) powder pattern. This means that the construction composition has no history of storage in high humidity environments. We believe that otherwise, ettringite among other cementitious hydration products is formed already in the powdery composition. Although these ettringite crystals are broken up at the time of mixing the construction composition with water at the time of use, the ettringite formation control provided by the invention is less prominent. Thus, storage of the construction composition in high humidity environments should be avoided.

The invention also relates to the construction composition in freshly mixed form, i.e. mixed with water. The amount of water is in the range of 120 to 225 L per $m^3$, preferably 130 to 180 L per $m^3$, of the freshly mixed construction composition.

The freshly mixed composition can be for example concrete, mortar or grout.

The term "mortar" or "grout" denotes a cement paste to which are added fine aggregates, i.e. aggregates whose diameter is between 150 µm and 5 mm (for example sand), and optionally very fine aggregates. A grout is a mixture of sufficiently low viscosity for filling in voids or gaps. Mortar viscosity is high enough to support not only the mortars own weight but also that of masonry placed above it. The term "concrete" denotes a mortar to which are added coarse aggregates, i.e. aggregates with a diameter of greater than 5 mm.

Preferably, the aggregate h) is present in an amount of 500 to 1900 kg per $m^3$, preferably 700 to 1700 kg per $m^3$, of the freshly mixed construction composition.

The construction composition may be provided as a dry mix to which water is added on-site to obtain the freshly mixed construction composition. Alternatively, the construction composition may be provided as a ready-mixed or freshly mixed composition.

The aqueous construction composition is obtainable by mixing a powdery component C, containing the cementitious binder a) and the sulfate source d), and a liquid aqueous component W, wherein the ettringite formation controller f) is contained in one or both of components C and W. The polyol e) and the co-retarder g) are preferably comprised in component W. The optional extraneous aluminate source c) is preferably comprised in component C.

The sequence of addition of the fine material b) depends primarily on the water content of ingredient b). When ingredient b) is provided in an essentially anhydrous form, it can conveniently be included in component C. Otherwise, and more commonly, ingredient b) is pre-mixed with component W, and component C is blended in subsequently.

This mixing regimen prevents the immediate formation of ettringite, which would occur if the cementitious binder a) is exposed to water without the simultaneous presence of ettringite formation controller f).

In a practical embodiment, the ettringite formation controller f), the polyol e) and co-retarder g) are dissolved in a part of the mixing water, and fine material b) is admixed. Subsequently, a pre-blended mix of the cementitious binder a), the sulfate source d), and optionally the extraneous aluminate source c) is added to the mixture. The remainder of the water is then added to adjust consistency.

Favorably, the composition exhibits a 3-hour compressive strength of at least 10 MPa at 20° C. For example, pre-cast concrete elements exhibit high compressive strengths at short times after casting. Hence, early demolding is possible, which allows for high demolding cycle rates without compromising final strength and durability.

The construction composition according to the invention is useful in applications such as producing building products, in particular for concretes such as on-site concrete, finished concrete parts, manufactured concrete parts (MCP's), pre-cast concrete parts, concrete goods, cast concrete stones, concrete bricks, in-situ concrete, ready-mix concrete, air-placed concrete, sprayed concrete/mortar, concrete repair systems, 3D printed concrete/mortar, industrial cement flooring, one-component and two-component sealing slurries, slurries for ground or rock improvement and soil conditioning, screeds, filling and self-levelling compositions, such as joint fillers or self-levelling underlayments, high performance concrete (HPC) and ultra high performance concrete (UHPC), hermetic fabricated concrete slabs, architectural concrete, tile adhesives, renders, cementitious plasters, adhesives, sealants, cementitious coating and paint systems, in particular for tunnels, waste water drains, screeds, mortars, such as dry mortars, sag resistant, flowable or self-levelling mortars, drainage mortars and concrete, or repair mortars, grouts, such as joint grouts, non-shrink grouts, tile grouts, injection grouts, wind-mill grouts (wind turbine grouts), anchor grouts, flowable or self-levelling grouts, ETICS (external thermal insulation composite systems), EIFS grouts (Exterior Insulation Finishing Systems, swelling explosives, waterproofing membranes or cementitious foams.

The invention is further illustrated by the appended drawing and the examples that follow.

FIG. 1 shows a plot of the photo current signal in mV against the time of dosage of $CaCl_2$ in the calcium aluminate precipitation test according to one embodiment of the invention.

METHODS

Testing Procedure—Mini-Slump for Mortars

The used procedure is analogous to DIN EN 12350-2, with the modification that a mini-slump cone (height: 15 cm, bottom width: 10 cm, top width: 5 cm) was used instead of a conventional Abrams cone. 2 L of the aqueous freshly mixed construction composition were filled into the mini-slump cone. The cone was filled completely immediately after mixing. Afterwards, the cone was placed on a flat surface, and lifted, and the slump of the mortar mix was measured. The slump of all mixes was adjusted to 11 cm by adjusting the dosage of the superplasticizer to allow for comparability.

Testing Procedure—Slump for Concrete

The used procedure is analogous to DIN EN 12350-2. The slump of all mixes was adjusted to 22 cm by adjusting the dosage of the superplasticizer to allow for comparability.

Testing Procedure—Early Strength Development for Mortars

The adjusted mortar mixes were each filled into mortar steel prisms (16/4/4 cm), and after 3 h at a temperature of 20° C. and relative humidity of 65%, a hardened mortar prism was obtained. The hardened mortar prism was demolded and compressive strength was measured according to DIN EN 196-1.

Testing Procedure—Early Strength Development for Concretes

The adjusted concrete mixes were each filled into concrete steel cubes (15/15/15 cm), and after 3 h at a temperature of 20° C. and relative humidity of 65%, a hardened concrete cube was obtained. The hardened concrete cube was demolded and compressive strength after 3 h was measured according to DIN EN 12390-3.

Testing Procedure—Final Strength Development for Concretes

The adjusted concrete mixes were each filled into concrete steel cubes (15/15/15 cm), and after 3 h at a tempera-ture of 20° C. and relative humidity of 65%, a hardened concrete cube was obtained. The hardened concrete cube was demolded and stored for 7 days at 20° C. in a water bath and further 21 days at 20° C. and relative humidity of 65% in a climate chamber. Compressive strength was measured after 28 days according to DIN EN 12390-3.

Testing Procedure—Setting Time

Setting time was determined with a Vicat needle according to DIN EN 480.

Testing Procedure—Durability

Water uptake was determined analogously to DIN 12390-9. Samples were stored in a climate chamber for 28 d and exposed to water afterwards. The water uptake over a period of 7 d was determined in % compared to the dry sample.

Scaling after 28 cycles, which is indicative of freeze thaw resistance, was determined according to DIN 12390-9 (CDF test).

To determine resistivity, concrete cubes hardened for 28 days as obtained above were placed in water for 2 days. Resistivity was measured via a Resipod instrument from Proceq on two opposed wet surfaces of the concrete cubes, and the average value was calculated To determine carbonation depth, concrete cubes hardened for 28 days as obtained above were stored in a carbonation chamber at 20° C., relative humidity of 65%, and an atmosphere comprising 4% of carbon dioxide for 28 days. Subsequently, the concrete cubes were split open and phenolphthalein was sprayed on the break surface. The carbonation front was determined according to DIN EN 12390-10.

Testing Procedure—Calcium Aluminate Precipitation Test

For the calcium aluminate precipitation test, an automated titration module (Titrando 905, available from Metrohm) equipped with a high performance pH-electrode (iUnitrode with Pt 1000, available from Metrohm) and a photosensor (Spectrosense 610 nm, available from Metrohm) was used. First, a solution of 400 mL of a 1 wt.-% aqueous solution of a polyol to be investigated and 20 mL of a 1 mol/L NaOH aqueous solution was equilibrated for 2 min under stirring in the automated titration module. Then, 50 mL of a 25 mmol/L $NaAlO_2$ aqueous solution was added thereto, followed by equilibration for another 2 min, obtaining an essentially clear test solution. In a next step, the test solution is titrated with a 0.5 mol/L $CaCl_2$ aqueous solution which is dosed with a constant rate of 2 mL/min. During the whole experiment, the temperature is hold constant at 20° C. The elapsed time to a turbidity inflection is recorded. To this end, the photo current signal in mV is plotted against the time of dosage of the $CaCl_2$) aqueous solution. From the diagram, the onset point is determined as the intersection of the baseline tangent with a tangent to the curve after the inflection of the curve.

Examples

Reference Example: Calcium Aluminate Precipitation-Inhibiting Properties of Polyols Various polyols were assed for their precipitation-properties in the calcium aluminate precipitation test. The results are shown in the table that follows. For the control, 400 mL of bidestilled water was used instead of 400 mL of a 1 wt.-% aqueous solution of a polyol. The titration endpoint, expressed as the maximum calcium concentration (as $Ca^{2+}$) before the onset of turbidity, is calculated from the elapsed time to the onset point. FIG. 1 shows a plot of the photo current signal in mV against the time of dosage of $CaCl_2$. Curve a) of FIG. 1 shows the results in the absence of a polyol ("blank"). Curve b) of FIG. 1 shows the results for addition of 1% of triethanolamine. For curve b), a first tangent 1, referred to as "baseline tangent", and a second tangent 2 are shown. From the baseline tangent 1 and the second tangent 2, the onset point in s may be determined as the intersection of the baseline tangent 1 with the second tangent 2.

| Polyol | control (without polyol) | ethylene glycol | glycerol | triethanol-amine | erythritol |
|---|---|---|---|---|---|
| Onset point [s] | 42 | 42 | 64 | 500 | 686 |
| Ca endpoint [ppm] | 59 | 59 | 93 | 682 | 924 |

All wt.-% are understood as % bwoc, i.e., as relative to the mass of cementitious binder a). Throughout the examples, retarder 7 of WO 2019/077050 was used as glyoxylic acid urea polycondensate. The total amounts of available aluminate per 100 g of the different cements employed are indicated in the tables below. The amount of available aluminate in the cementitious binder was determined by Rietveld refinement of an X-ray diffraction (XRD) powder pattern. Only the mineral phases C3A and C4AF were assessed.

Mortar mixes 1 to 13 were prepared, adjusted to the same slump and their early strength development and strength after 28 days was measured. Further, concrete mixes 14 to 20 were prepared, adjusted to the same slump and their early strength development and strength after 28 days was determined.

Mixing Procedure—Mortar Mixes

Crushed stones (2 to 5 mm) were dried in an oven at 70° C. for 50 h. Sand (0 to 4 mm) was dried for 68 h at 140° C. Afterwards, the crushed stones and sand were stored at 20° C. for at least 2 days at 65% relative humidity. A glyoxylic acid urea polycondensate, sodium gluconate, $NaHCO_3$ and a polycarboxylate based superplasticizer (Master Suna SBS 8000, available from Master Builders Solutions Deutschland GmbH) were added to the total amount of mixing water, so as to obtain a liquid aqueous component. Subsequently, crushed stones, sand, cementitious binder, anhydrite (CAB 30, available from Lanxess) and limestone were added to a 5 L Hobbart mixer. The liquid aqueous component was added thereto and the mixture was stirred for 2 min at level 1 (107 rpm) and for further 2 min at level 2 (198 rpm) to obtain an aqueous freshly mixed construction composition.

Mixing Procedure—Concrete Mixes

Crushed stones (2 to 16 mm) were dried in an oven at 70° C. for 50 h. Sand (0 to 4 mm) was dried for 68 h at 140° C. Afterwards, the crushed stones and sand were stored at 20° C. for at least 2 days at 65% relative humidity. A glyoxylic acid urea polycondensate, sodium gluconate, $NaHCO_3$ and a polycarboxylate based superplasticizer (Master Suna SBS 8000 or Master Glenium ACE 430, both available from Master Builders Solutions Deutschland GmbH) were added to the total amount of mixing water, so as to obtain a liquid aqueous component. Subsequently, crushed stones, sand, cementitious binder, anhydrite (CAB 30) and limestone were added to a 20 L Pemat mixer. The liquid aqueous component was added thereto and the mixture was stirred for 4 min at 60 rpm to obtain an aqueous freshly mixed construction composition.

TABLE 1

Mortar mixes.

| Mortar mix # | 1 | 2 | 3 | 4 | 5 | 6 |
|---|---|---|---|---|---|---|
| CEM I 52,5 R [kg/m³] | 275 | 275 | 275 | 275 | 276 | 276 |
| Sand (0 to 4 mm) [kg/m³] | 1349 | 1317 | 1354 | 1352 | 1343 | 1344 |
| Crushed stones (2 to 5 mm) [kg/m³] | 300 | 294 | 302 | 301 | 299 | 300 |
| Available aluminate from CEM I 52,5 R (mol/100 g cement) | 0.092[2] | 0.092[2] | 0.092[2] | 0.092[2] | 0.092[2] | 0.084[3] |
| Blaine surface area [cm²/g] | 5000 | 5000 | 5000 | 5000 | 5000 | 4800 |
| Fly ash (Dv90: 94 µm) [kg/m³] | 275 | 275 | 0 | 0 | 0 | 0 |
| Limestone powder (Dv90: 26 µm) [kg/m³] | 0 | 0 | 275 | 275 | 276 | 276 |
| Water [L/m³] | 158 | 173 | 173 | 173 | 183 | 183 |
| Anhydrite (CAB 30) [wt.-%] | 15 | 15 | 15 | 15 | 15 | 15 |
| Amorphous Al(OH)₃ [wt.-%] | 0 | 0 | 0 | 3 | 0 | 0 |
| Molar ratio of total available aluminate to sulfate | 0.61 | 0.61 | 0.61 | 0.72 | 0.61 | 0.60 |
| Master Suna SBS 8000 [wt.-%] [1] | 0.38 | 0.25 | 0.28 | 0.33 | 0.3 | 0.3 |
| Glycerol [wt.-%] | 1.5 | 2 | 2 | 1.5 | 2 | 2 |
| Glyoxylic acid urea polycondensate [wt.-%] [1] | 1 | 1 | 1 | 1 | 1 | 0.67 |
| NaHCO₃ [wt.-%] | 0.37 | 0.5 | 0.5 | 0.75 | 0.5 | 0.5 |
| Sodium gluconate [wt.-%] | 0.077 | 0.077 | 0.077 | 0.1 | 0.077 | 0.077 |
| Setting time [min] | 30 | 30 | 30 | 20 | 65 | 95 |
| Compressive strength after 3 h [MPa] | 16 | 14 | 14 | 17.5 | 15 | 10 |

| Mortar mix # | 7 | 8 | 9 | 10 | 11 | 12 | 13* |
|---|---|---|---|---|---|---|---|
| CEM I 52,5 R [kg/m³] | 276 | 276 | 386 | 386 | 386 | 386 | 386 |
| Sand (0 to 4 mm) [kg/m³] | 1345 | 1343 | 1337 | 1337 | 1341 | 1339 | 1337 |
| Crushed stones (2 to 5 mm) [kg/m³] | 300 | 299 | 298 | 298 | 299 | 298 | 298 |
| Available aluminate (mol/100 g cement) | 0.075[4] | 0.067[5] | 0.092[2] | 0.084[3] | 0.075[4] | 0.067[5] | 0.022[6] |

TABLE 1-continued

| Mortar mixes. | | | | | | | |
|---|---|---|---|---|---|---|---|
| Blaine surface area [cm²/g] | 4500 | 5200 | 5000 | 4800 | 4500 | 5200 | 3900 |
| Fly ash (Dv90: 94 μm) [kg/m³] | 0 | 0 | 0 | 0 | 0 | 0 | 0 |
| Limestone powder (Dv90: 26 μm) [kg/m³] | 276 | 276 | 166 | 166 | 166 | 166 | 166 |
| Water [L/m³] | 183 | 183 | 183 | 183 | 183 | 183 | 183 |
| Anhydrite (CAB 30) [wt.-%] | 15 | 15 | 15 | 15 | 15 | 15 | 15 |
| Molar ratio of total available aluminate to sulfate | 0.53 | 0.48 | 0.61 | 0.60 | 0.53 | 0.48 | 0.17 |
| Master Suna SBS 8000 [wt.-%] [1] | 0.3 | 0.3 | 0.2 | 0.2 | 0.2 | 0.2 | 0.2 |
| Glycerol [wt.-%] | 2 | 2 | 2 | 2 | 2 | 2 | 2 |
| Glyoxylic acid urea polycondensate [wt.-%] [1] | 1 | 1 | 0.67 | 0.67 | 0.67 | 0.67 | 0.67 |
| NaHCO₃ [wt.-%] | 0.5 | 0.5 | 0.5 | 0.5 | 0.5 | 0.5 | 0.5 |
| Sodium gluconate [wt.-%] | 0.077 | 0.077 | 0.077 | 0.077 | 0.077 | 0.077 | 0.077 |
| Setting time [min] | 110 | 150 | 50 | 40 | 75 | 145 | 105 |
| Compressive strength after 3 h [MPa] | 6 | 5 | 24 | 20 | 16 | 4 | 0 |

*comparative example
[1] dosage calculated as active substance
[2] Karlstadt CEM I 52,5 R
[3] Couvrot CEM I 52,5 R
[4] Burglengenfeld CEM I 52,5 R
[5] Spenner CEM I 52,5 R
[6] Aalborg White CEM I 52,5 R

TABLE 2

| Concrete mixes. | | | | | | |
|---|---|---|---|---|---|---|
| Concrete mix # | 14 | 15 | 16 | 17 | 18* | 19* |
| CEM I 52,5 R [kg/m³] | 200 | 200 | 280 | 280 | 400 | 400 |
| Sand (0 to 4 mm) [kg/m³] | 941 | 941 | 936 | 936 | 895 | 783 |
| Crushed stones (2 to 16 mm) [kg/m³] | 939 | 939 | 934 | 934 | 892 | 781 |
| Available aluminate (mol/100 g cement) | 0.092[2] | 0.084[3] | 0.084[3] | 0.075[4] | 0.092[2] | 0.092[2] |
| Blaine surface area [cm²/g] | 5000 | 4800 | 4800 | 4500 | 5000 | 5000 |
| Limestone powder (Dv90: 26 μm) [kg/m³] | 200 | 200 | 120 | 120 | 50 | 50 |
| Water [L/m³] | 126 | 126 | 126 | 126 | 160 | 252 |
| Ratio of water/cementitious binder | 0.63 | 0.63 | 0.45 | 0.45 | 0.4 | 0.63 |
| Anhydrite (CAB 30) [wt.-%] | 15 | 15 | 15 | 15 | 0 | 0 |
| Molar ratio of total available aluminate to sulfate | 0.61 | 0.60 | 0.60 | 0.53 | 2.02 | 2.02 |
| Master Suna SBS 8000 [wt.-%] [1] | 0.4 | 0.3 | 0.3 | 0.24 | 0 | 0 |
| Master Glenium ACE 430 [wt.-%] [1] | 0 | 0 | 0 | 0 | 0.22 | 0 |
| Glycerol [wt.-%] | 2 | 2 | 2 | 2 | 0 | 0 |
| Glyoxylic acid urea polycondensate [wt.-%] [1] | 1 | 0.66 | 0.66 | 0.66 | 0 | 0 |
| NaHCO₃ [wt.-%] | 0.5 | 0.5 | 0.5 | 0.5 | 0 | 0 |
| Sodium gluconate [wt.-%] | 0.077 | 0.077 | 0.077 | 0.077 | 0 | 0 |
| Compressive strength after 3 h [MPa] | 15 | 10 | 20 | 16 | 0 | 0 |
| Compressive strength after 28 d [MPa] | 92 | 80 | 97 | 101 | 94 | 53 |
| Setting time [min] | 30 | 50 | 40 | 75 | >120 | >120 |
| Concrete mix # | 20* | 21* | 22 | 23 | 24 | 25 |
| CEM I 52,5 R [kg/m³] | 400 | 180 | 220 | 280 | 320 | 180 |
| Sand (0 to 4 mm) [kg/m³] | 783 | 967 | 965 | 963 | 961 | 967 |
| Crushed stones (2 to 16 mm) [kg/m³] | 781 | 909 | 908 | 905 | 904 | 910 |
| Available aluminate (mol/100 g cement) | 0.084[3] | 0.064[7] | 0.064[7] | 0.064[7] | 0.064[7] | 0.092[2] |
| Blaine surface area [cm²/g] | 4800 | 5200 | 5200 | 5200 | 5200 | 5000 |
| Limestone powder (Dv90: 26 μm) [kg/m³] | 50 | 220 | 180 | 120 | 80 | 220 |
| Water [L/m³] | 252 | 126 | 126 | 126 | 126 | 126 |
| Ratio of water/cementitious binder | 0.63 | 0.70 | 0.58 | 0.45 | 0.40 | 0.70 |
| Anhydrite (CAB 30) [wt.-%] | 0 | 15 | 15 | 15 | 15 | 15 |
| Molar ratio of total available aluminate to sulfate | 2.08 | 0.47 | 0.47 | 0.47 | 0.47 | 0.61 |

TABLE 2-continued

Concrete mixes.

| | | | | | | |
|---|---|---|---|---|---|---|
| Master Suna SBS 8000 [wt.-%] [1] | 0 | 0.3 | 0.3 | 0.3 | 0.3 | 0.3 |
| Master Glenium ACE 430 [wt.-%] [1] | 0 | 0 | 0 | 0 | 0 | 0 |
| Glycerol [wt.-%] | 0 | 2 | 2 | 2 | 2 | 2 |
| Glyoxylic acid urea polycondensate [wt.-%] [1] | 0 | 0.66 | 0.66 | 0.66 | 0.66 | 0.66 |
| NaHCO$_3$ [wt.-%] | 0 | 0.5 | 0.5 | 0.5 | 0.5 | 0.5 |
| Sodium gluconate [wt.-%] | 0 | 0.077 | 0.077 | 0.077 | 0.077 | 0.077 |
| Compressive strength after 3 h [MPa] | 0 | 5 | 6 | 9 | 11 | 11 |
| Compressive strength after 28 d [MPa] | 52 | 64 | 74 | 87 | 96 | 70 |
| Setting time [min] | >120 | 45 | 40 | 50 | 75 | 5 |

| Concrete mix # | 26 | 27 | 28 | 29 | 30* | 31 | 32 |
|---|---|---|---|---|---|---|---|
| CEM I 52,5 R [kg/m$^3$] | 180 | 200 | 200 | 280 [9] | 280 [10] | 200 | 200 |
| Sand (0 to 4 mm) [kg/m$^3$] | 966 | 965 | 965 | 963 | 963 | 941 | 941 |
| Crushed stones (2 to 16 mm) [kg/m$^3$] | 909 | 908 | 908 | 905 | 905 | 939 | 939 |
| Available aluminate (mol/100 g cement) | 0.092[8] | 0.092[8] | 0.092[2] | 0.050[9] | 0.036[10] | 0.092[2] | 0.084[3] |
| Blaine surface area [cm$^2$/g] | 3800 | 3800 | 5000 | 4719 | 4290 | 5000 | 4800 |
| Limestone powder (Dv90: 26 µm) [kg/m$^3$] | 220 | 200 | 200 | 120 | 120 | 200 | 200 |
| Water [L/m$^3$] | 126 | 126 | 126 | 126 | 126 | 126 | 126 |
| Ratio of water/cementitious binder | 0.70 | 0.63 | 0.63 | 0.45 | 0.45 | 0.63 | 0.63 |
| Anhydrite (CAB 30) [wt.-%] | 15 | 15 | 5 | 15 | 15 | 15 | 15 |
| Molar ratio of total available aluminate to sulfate | 0.61 | 0.61 | 1.11 | 0.76 | 0.57 | 0.61 | 0.60 |
| Master Suna SBS 8000 [wt.-%] [1] | 0.3 | 0.3 | 0.3 | 0.3 | 0.3 | 0.4 | 0.3 |
| Master Glenium ACE 430 [wt.-%] [1] | 0 | 0 | 0 | 0 | 0 | 0 | 0 |
| Glycerol [wt.-%] | 2 | 2 | 2 | 2 | 2 | 2 | 2 |
| Glyoxylic acid urea polycondensate [wt.-%] [1] | 0.66 | 0.66 | 0.66 | 0.66 | 0.66 | 1 | 0.66 |
| NaHCO$_3$ [wt.-%] | 0.5 | 0.5 | 0.5 | 0.5 | 0.5 | 0.5 | 0.5 |
| Sodium gluconate [wt.-%] | 0.077 | 0.077 | 0.077 | 0.077 | 0.077 | 0 | 0 |
| Citric acid [wt.-%] | 0 | 0 | 0 | 0 | 0 | 0.077 | 0.077 |
| Compressive strength after 3 h [MPa] | 10 | 13 | 5 | 7 | 4 | 12 | 8 |
| Compressive strength after 28 d [MPa] | 60 | 65 | 73 | 86 | 81 | 69 | 70 |
| Setting time [min] | 7 | 8 | 7 | 40 | 25 | 4 | 7 |

*comparative example
[1] dosage calculated as active substance
[2] Karlstadt CEM I 52,5 R
[3] Couvrot CEM I 52,5 R
[4] Burglengenfeld CEM I 52,5 R
[7] Milke CEM I 52,5 R
[8] Karlstadt CEM I 52,5 N
[9] 186 kg/m$^3$ Milke CEM I 52,5 R + 94 kg/m$^3$ Aalborg White CEM I 52,5 R
[10] 94 kg/m$^3$ Milke CEM I 52,5 R + 186 kg/m$^3$ Aalborg White CEM I 52,5 R The inventive mixes show rapid strength development once setting commences. Hence, the open time largely corresponds to the setting time.

For selected concrete mixes, durability tests were performed.

TABLE 3

Durability tests at a ratio of water/cementitious binder of 0.63.

| Concrete mix # | 14 | 15 | 19* | 20* |
|---|---|---|---|---|
| Water uptake after 28 days [%] | 0.52 | 0.9 | 1.01 | 1.40 |
| Scaling after 28 cycles [g/m$^2$] | 2645 | 2590 | 5420 | 4948 |
| Resistivity [kΩcm] | 8.3 | 8.3 | 2.2 | 5.2 |
| Carbonation depth [mm] | 4 | 5 | 8 | 5 |

*comparative example

It is evident that concrete mixes 14 and 15 according to the invention exhibit superior water uptake and scaling than comparative mixes 19 and 20, as well as a higher resistivity and comparable or favorably reduced carbonation depth.

The invention claimed is:

1. A cement-reduced construction composition comprising
   a) a cementitious binder comprising one or more calcium silicate mineral phases and one or more calcium aluminate mineral phases, and having a Blaine surface area of at least 3800 cm$^2$/g, in an amount of 180 to 400 kg per m$^3$ of a freshly mixed construction composition;
   b) a fine material having a Dv90 of less than 200 µm, selected from alkali-activatable binders, rock powders and inorganic pigments, or mixtures thereof, in a total amount of 20 to 200 parts by weight, relative to 100 parts by weight of cementitious binder a);
   c) optionally, an extraneous aluminate source;
   d) a sulfate source; and
   e) a polyol in an amount of 0.3 to 2.5 wt.-%, relative to the amount of cementitious binder a);
   wherein the composition contains available aluminate, calculated as Al(OH)$_4^-$, from the calcium aluminate mineral phases plus the optional extraneous aluminate source, per 100 g of cementitious binder a), in a total amount of
  at least 0.08 mol, if the amount of cementitious binder a) is in the range of 180 to less than 220 kg per m³ of the freshly mixed construction composition,
  at least 0.06 mol, if the amount of cementitious binder a) is in the range of 220 to less than 280 kg per m³ of the freshly mixed construction composition, and
  at least 0.05 mol, if the amount of cementitious binder a) is 280 kg or more per m³ of the freshly mixed construction composition;
and the molar ratio of total available aluminate to sulfate is 0.4 to 2.0;
the construction composition further comprising
f) an ettringite formation controller comprising (i) glyoxylic acid, a glyoxylic acid salt and/or a glyoxylic acid derivative; and (ii) at least one of (ii-a) a borate source and (ii-b) a carbonate source, wherein the carbonate source is selected from inorganic carbonates having an aqueous solubility of 0.1 g·L⁻¹ or more at 25° C., organic carbonates, and mixtures thereof, and
g) a co-retarder selected from (g-1) α-hydroxy monocarboxylic acids and salts thereof, (g-2) phosphonic acids and salts thereof, (g-3) polycarboxylic acids and salts thereof, and mixtures thereof.

2. The composition according to claim 1, wherein the calcium silicate mineral phases and calcium aluminate mineral phases constitute at least 90 wt.-% of the cementitious binder a), and the calcium silicate mineral phases constitute at least 60 wt.-% of the cementitious binder a).

3. The composition according to claim 1, wherein the calcium aluminate mineral phases are selected from C3A, C4AF, and C12A7.

4. The composition according to claim 1, wherein the cementitious binder a) is Portland cement.

5. The composition according to claim 1, wherein the alkali-activatable binder is selected from latent hydraulic binders and pozzolanic binders.

6. The composition according to claim 1, wherein the rock powder is a silicate or carbonate rock powder.

7. The composition according to claim 1, wherein the inorganic pigment is selected from iron oxides, titanium dioxide, cobalt-chrome-aluminum-spinels, and chrome(III)-oxides.

8. The composition according to claim 1, wherein the fine material has a Dv90 of less than 150 μm.

9. The composition according to claim 1, wherein the extraneous aluminate source c) is selected from non-calciferous aluminate sources and calciferous aluminate sources.

10. The composition according to claim 1, wherein the sulfate source d) is a calcium sulfate source.

11. The composition according to claim 1, wherein the cementitious binder a) has a Blaine surface area of at least 4500 cm²/g.

12. The composition according to claim 1, wherein the polyol, in a calcium aluminate precipitation test in which a test solution, obtained by supplementing 400 mL of a 1 wt.-% aqueous solution of the polyol with 20 mL of a 1 mol/L NaOH aqueous solution and 50 mL of a 25 mmol/L NaAlO₂ aqueous solution, is titrated with a 0.5 mol/L CaCl₂ aqueous solution at 20° C., inhibits precipitation of calcium aluminate up to a calcium concentration of 75 ppm.

13. The composition according to claim 12, wherein the polyol is selected from monosaccharides, oligosaccharides, water-soluble polysaccharides, compounds of general formula (P-I) or dimers or trimers of compounds of general formula (P-I):

wherein X is

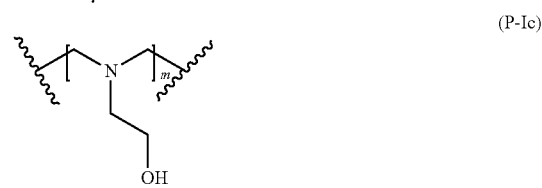

wherein
R is —CH₂OH, —NH₂,
n is an integer from 1 to 4,
m is an integer from 1 to 8.

14. The composition according to claim 1, wherein the glyoxylic acid derivative is a glyoxylic acid polymer.

15. The composition according to claim 1, wherein the glyoxylic acid, glyoxylic acid salt and/or glyoxylic acid derivative (i) is present in a total amount of 0.2 to 2 wt.-% relative to the amount of cementitious binder a).

16. The composition according to claim 1, wherein the inorganic carbonate is selected from potassium carbonate, sodium carbonate, sodium bicarbonate, lithium carbonate and magnesium carbonate; and the organic carbonate is selected from ethylene carbonate, propylene carbonate and glycerol carbonate.

17. The composition according to claim 1, wherein the carbonate source (ii-b) is present in an amount of 0.3 to 1 wt.-%, relative to the amount of cementitious binder a).

18. The composition according to claim 1, wherein the α-hydroxy monocarboxylic acid salt is sodium gluconate.

19. The composition according to claim 1, wherein the polycarboxylic acid or a salt thereof (g-3) has a milliequivalent number of carboxyl groups of 3.0 meq/g or higher assuming all the carboxyl groups to be in unneutralized form.

20. The composition according to claim 1, wherein the polycarboxylic acid is selected from phosphonoalkyl carboxylic acids, amino carboxylic acids, and polymeric carboxylic acids.

21. The composition according to claim 1, wherein the composition additionally comprises
  h) at least one aggregate.

22. The composition according to claim 1, additionally comprising a dispersant.

23. The composition according to claim 22, wherein the dispersant is selected from the group of
- comb polymers having a carbon-containing backbone to which are attached pendant cement-anchoring groups and polyether side chains,
- non-ionic comb polymers having a carbon-containing backbone to which are attached pendant hydrolysable groups and polyether side chains, the hydrolysable groups upon hydrolysis releasing cement-anchoring groups,
- colloidally disperse preparations of polyvalent metal cations, and a polymeric dispersant which comprises anionic and/or anionogenic groups and polyether side chains, and the polyvalent metal cation is present in a superstoichiometric quantity, calculated as cation equivalents, based on the sum of the anionic and anionogenic groups of the polymeric dispersant,
- sulfonated melamine-formaldehyde condensates,
- lignosulfonates,
- sulfonated ketone-formaldehyde condensates,
- sulfonated naphthalene-formaldehyde condensates,
- phosphonate containing dispersants,
- phosphate containing dispersants, and
- mixtures thereof.

24. The composition according to claim 1, wherein the construction composition comprises less than 5 wt.-% of cementitious hydration products, relative to the total weight of the construction composition.

25. The composition according to claim 1 in freshly mixed form, comprising water in an amount of 120 to 225 L per m$^3$ of the freshly mixed construction composition.

26. The composition according to claim 25, exhibiting a 3-hour compressive strength according to DIN EN 196-1 of at least 10 MPa at 20° C.

* * * * *